UNITED STATES PATENT OFFICE.

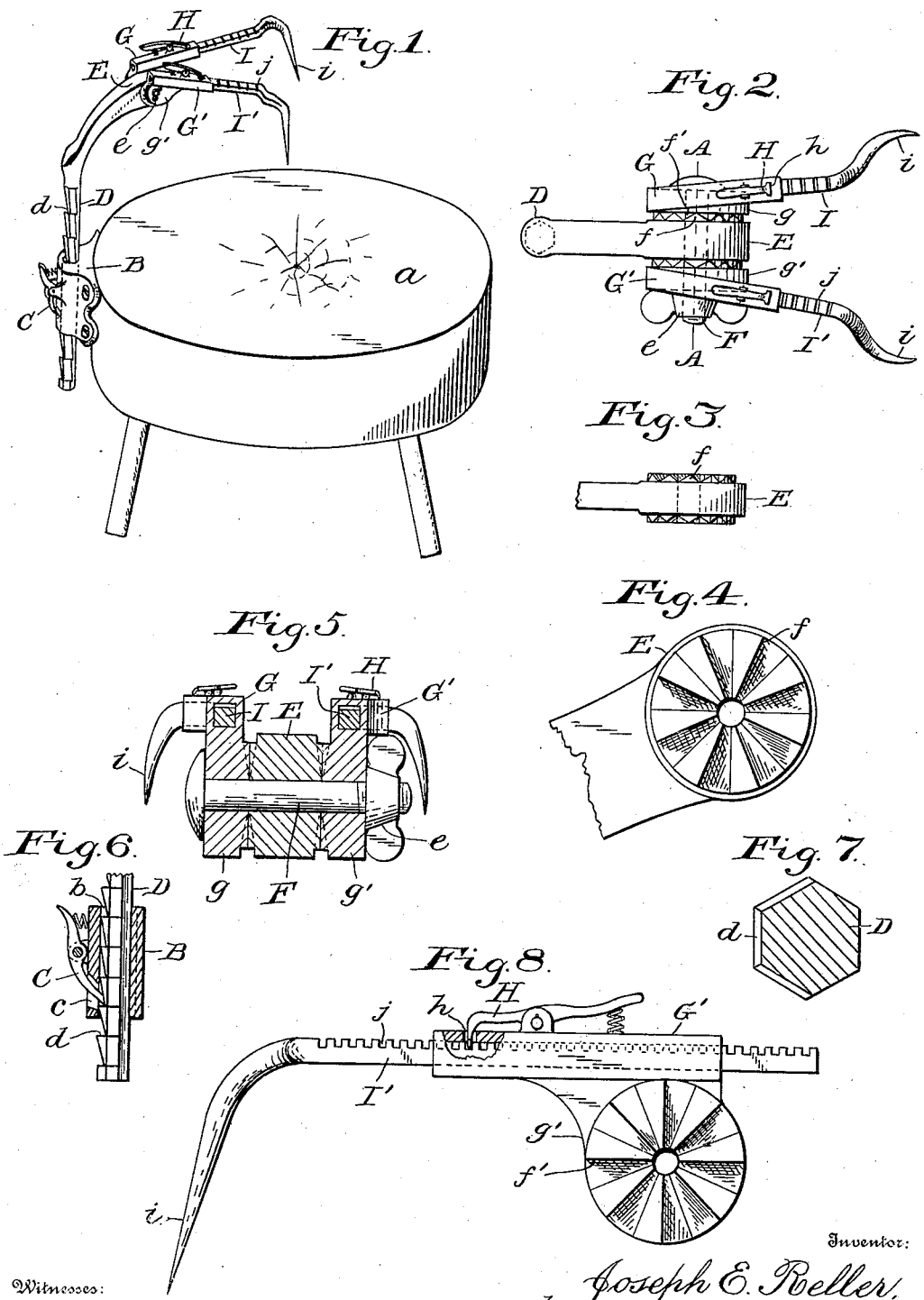

JOSEPH E. RELLER, OF INDIANAPOLIS, INDIANA.

MEAT-CLAMP FOR BUTCHERS' BLOCKS.

No. 845,263.　　　Specification of Letters Patent.　　　Patented Feb. 26, 1907.

Application filed October 30, 1905. Serial No. 285,063.

*To all whom it may concern:*

Be it known that I, JOSEPH E. RELLER, a citizen of the United States, residing at Indianapolis, in the county of Marion and State of Indiana, have invented a new and useful Improvement in Meat-Clamps for Butchers' Blocks; and I do declare the following to be a full, clear, and exact description of the invention, reference being had to the accompanying drawings, and to the letters and figures of reference marked thereon, which form a part of this specification.

This invention relates to appliances that are designed to be attached to the blocks on which retail meat dealers cut or chop meat, the appliances being adapted for clamping bulk meat to the block in order to enable the butcher to cut the meat and saw the bones therein expeditiously and neatly, the invention having reference particularly to meat-clamps that may be detachably and adjustably mounted on the blocks and also be adjustable to different shapes and sizes of pieces of bulk meat.

Objects of the invention are to provide a meat-clamp adapted to hold bulk meat steadily on the cutting-block without injury to the block, to provide a meat-clamp that may be readily applied to the block or removed therefrom, a clamp that may be easily cleansed, and one which will be durable and economical in use.

With the above-mentioned and minor objects in view the invention consists in a meat-clamp comprising a base adapted to be attached to a cutting-block and provided with a latch, a clamping-head having a stem adapted to fit movably in the base to be held by the latch thereof, and a pair of sharp-pointed fingers attached to longitudinally-movable clamp-arms that are adjustably attached to the clamping-head; and the invention consists, further, in the novel parts and the combinations and arrangements of parts, as hereinafter particularly described and claimed.

Referring to the drawings, Figure 1 is a perspective view of a butcher's block having the meat-clamp mounted thereon and shown perspectively; Fig. 2, a top plan of the meat-clamp; Fig. 3, a top plan of the clamping-head; Fig. 4, a side elevation of the clamping-head; Fig. 5, a vertical sectional view on the line A A in Fig. 2; Fig. 6, a transverse vertical sectional view of the holder with a part of the clamp-stem therein; Fig. 7, a transverse sectional view of the holder-stem, and Fig. 8 a side elevation of one of the longitudinally-movable clamp-arms and its holder.

Similar reference characters in the several figures of the drawings designate like parts or features.

In the drawings, $a$ designates a butcher's meat-block on which bulk meat may be placed to be cut up into slices or small pieces for retailing. A base B is provided that is adapted to be secured to a side of the meat-block, the base having a vertical hexagonal opening $b$ therethrough and also a lateral opening $c$ communicating with the vertical opening. A latch C is pivoted on the base and has an end spring pressed into the opening $c$. A clamp-stem D is insertible into the opening $b$, the stem being preferably hexagonal in cross-section and the opening $b$ corresponding thereto in contour, so as to prevent rotation of the stem in the base, and in three faces of the stem are notches $d$ to receive the end of the latch C, the notches being preferably shaped so as to form ratchet-teeth. The latch may ordinarily hold the stem against descending of its own weight; but when the stem is pressed downwardly the latch will lock the stem against upward movements thereof. A clamping-head E is attached to the top of the stem D and is provided with a horizontal binding-bolt F, that projects beyond the sides thereof, the bolt having a thumb-nut $e$ thereon. The sides of the clamping-head are provided with radially-disposed ribs $f$.

A pair of clamp-arm holders G and G' have plates $g$ and $g'$, that are provided with radially-disposed ribs $f'$, that are adapted to mesh or interlock with the ribs $f$ of the clamping-head, the plates being adjustably attached to the sides of the clamping-head by the binding-bolt F and secured against rotation by the ribs. In the holders, which are hollow, are openings $h$, and each holder is provided with a pivoted latch H, that has an end spring-pressed into the opening $h$ of the holder. A pair of clamp-arms I and I' are mounted slidingly in the holders G and G' and have each a sharp-pointed clamp-finger $i$ extending at an angle to the arm, the arm having a plurality of notches $j$ to receive the end of the latch H for holding the arm adjustably against longitudinal movements thereof.

In practical use the base B will remain attached to the block a, and the stem D may be inserted into the base or removed therefrom at will. The stem may be inserted so that the fingers i will point toward the center of the block, or the stem may be inserted so that the fingers will point toward one side or the other of the center, and after placing a piece of meat upon the block under the fingers the clamp-arms and their holders may be quickly adjusted so that the fingers i may be pushed or forced into the piece of meat, while the stem D descends into the base B and becomes latched. The fingers should enter the meat until they engage opposite sides of the bone that may be in the bulk of meat. Then the bulk will be held securely by the fingers, and cuts may be readily made in an expeditious and neat manner even while using a saw or a cleaver.

Having thus described the invention, what is claimed as new is—

1. A meat-clamp including a base, a clamping-head having a stem attachable to the base and provided with locking devices, a holder having locking devices corresponding to the locking devices of the clamping-head, means for binding the locking devices of the holder in engagement with the locking devices of the clamping-head, and an arm mounted in the holder and provided with a sharp-pointed finger.

2. A meat-clamp including a clamping-head having a supporting-stem and provided on opposite sides thereof with locking devices, a pair of holders having locking devices corresponding to the locking devices of the clamping-head and independently attachable adjustably thereto, means for binding the locking devices of the holders in engagement with the locking devices of the clamping-head, and arms mounted in the holders and provided with sharp-pointed fingers.

3. A meat-clamp including a base, a clamping-head having a stem attachable to the base, the head having locking devices on the sides thereof and provided with a binding-bolt and nut, a pair of holders having locking devices corresponding to the locking devices of the clamping-head and secured to the head by the binding-bolt and nut, and arms mounted adjustably in the holders and provided with sharp-pointed fingers.

4. A meat-clamp including a clamping-head having a supporting-stem, a hollow clamp-arm holder mounted adjustably on the clamping-head and provided with a latching device, and a clamp-arm provided with a sharp-pointed finger and adjustable longitudinally in the holder to be held by the latching device thereof.

5. The combination with a butcher's block of a base attached thereto and having a hexagonal opening, a clamping-head having a pointed finger or fingers overhanging the block and a notched hexagonal stem axially adjustable in the base, and a spring-latch engaging the notches of the clamping-head stem and resisting its withdrawal from the base.

In testimony whereof I affix my signature in presence of two witnesses.

JOSEPH E. RELLER.

Witnesses:
 WM. C. THOMPSON,
 E. T. SILVIUS.